UNITED STATES PATENT OFFICE.

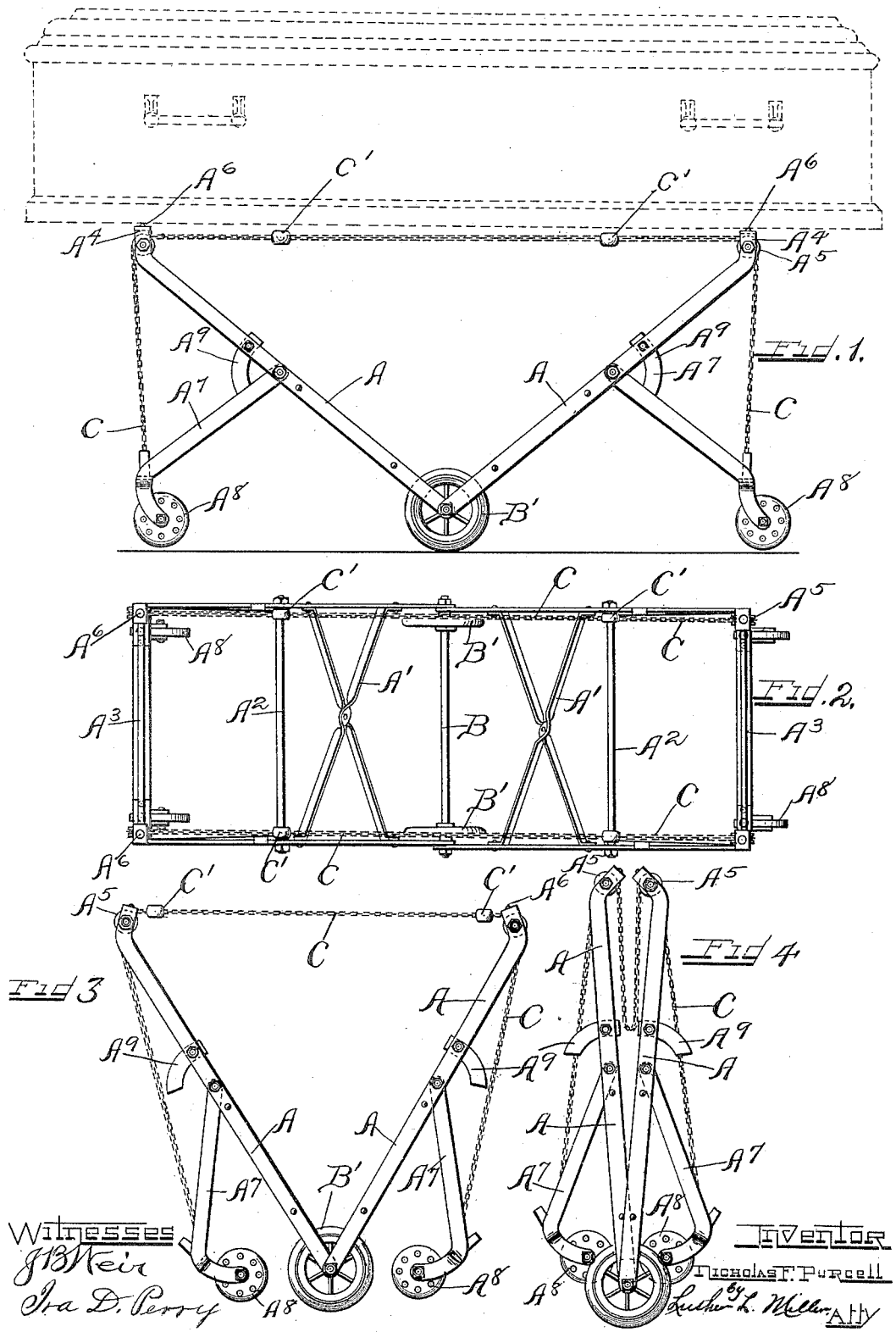

NICHOLAS F. PURCELL, OF CHICAGO, ILLINOIS.

CASKET-TRUCK.

SPECIFICATION forming part of Letters Patent No. 649,951, dated May 22, 1900.

Application filed October 23, 1899. Serial No. 734,514. (No model.)

*To all whom it may concern:*

Be it known that I, NICHOLAS F. PURCELL, a citizen of the United States, residing at Chicago, in the county of Cook and State of Illinois, have invented certain new and useful Improvements in Trucks, of which the following is a specification.

The object of this invention is the production of a light strong folding truck particularly adapted for the use of undertakers.

In the accompanying drawings, Figure 1 is a side elevation of this truck extended for use and supporting a casket. Fig. 2 is a plan view of the truck. Fig. 3 is a side elevation of the truck partially folded, and Fig. 4 is a similar view representing the truck as completely folded.

Like letters of reference indicate corresponding parts throughout the several views.

This truck is composed of two folding members hinged together. These members are identical in construction, each having a supporting-bracket pivotally attached to its side. The outer extremities of these brackets are connected by two chains passing over sheaves mounted near the free ends of the folding members. Following this brief outline the body of this truck is composed of the two duplicate frame members A, rectangular in outline. Each frame member is braced near its lower end with the diagonal braces $A'$, near its middle portion with the rod $A^2$, and at its upper and outer end with the rod $A^3$. The side bars of the frame members A are curved upward and bent transversely inward, forming box loops $A^4$, providing recesses for the sheaves $A^5$, one of which sheaves is rotatably mounted near each end of the two rods $A^3$. The upper side of each of the box loops $A^4$ is provided with a spur-stud $A^6$ for engaging the under side of the casket resting on the truck and preventing accidental displacement of said casket. The supporting-brackets $A^7$ are pivotally mounted on the rods $A^2$, one bracket for each of the members A of the truck. Each of these brackets $A^7$ is provided with the two caster-wheels $A^8$, and the upward pivotal movement of said brackets is limited by the curved stop-blocks $A^9$, rigidly secured to the side bars of the frame members A. These frame members A are hinged together at their lower ends, being mounted upon the shaft B, which shaft carries the main supporting-wheels $B'$. Two chains C extend over the sheaves $A^5$ and are attached at their ends to each of the pivoted supporting-brackets $A^7$. The position of the curved stop-blocks $A^9$ and the length of the two chains C are such that the caster-wheels $A^8$ will be raised a little higher than the lower part of the periphery of the supporting-wheels $B'$, so that in wheeling the truck all of said caster-wheels may be raised from the floor, the truck and its load being balanced upon the supporting-wheels $B'$. This construction permits of turning the truck more freely and handling it more easily than if the caster-wheels rested upon the floor.

$C'$ are stop-balls on the chain C. Their purpose is merely to prevent the slack in the chain when the truck is folded from accumulating and becoming tangled.

When the truck is folded, the chains are slack, the two frame members A are folded together, and the supporting-brackets $A^7$ drop downward, lying beside the supporting-wheels $B'$. To extend the truck, the upper ends of the frame members A are separated. This movement draws the chains taut and raises the supporting-brackets $A^7$ against the stop-blocks $A^9$. The truck is then in its extended position. It is folded by grasping the rods $A^3$ and bringing the outer ends of the frame members A together. The supporting-brackets then fall of their own weight into their folded positions.

I claim as my invention—

1. In a folding truck, in combination, two frame members hinged together; supporting-wheels therefor; a supporting-bracket pivotally secured to one of said members; and a flexible connecting means extending between the frame members, and being attached at one of its ends to said supporting-bracket.

2. In a folding truck, in combination, two frame members hinged together; supporting-wheels therefor; a supporting-bracket pivotally secured to each of said members; and a flexible connecting means having a sliding engagement with said members, and being attached at each of its ends to one of said supporting-brackets.

3. In a folding truck, in combination, two frame members hinged together; supporting-wheels therefor; a supporting-bracket pivotally secured to each of said members; a stop for limiting the pivotal movement of said supporting-bracket; and a flexible connecting means extending over said frame members, and being attached at each of its ends to one of said supporting-brackets.

4. In a folding truck, in combination, two frame members hinged together; supporting-wheels therefor; a supporting-bracket pivotally secured to each of said members; a caster-wheel on each of said brackets; a stop for limiting the outward pivotal movement of each of said brackets; and a flexible connecting means extending over said frame members, and being attached at each of its ends to one of said supporting-brackets.

5. In a folding truck, in combination, two frame members hinged together; supporting-wheels therefor; a supporting-bracket pivotally secured to each of said members; and a chain extending between said frame members, and being attached at each of its ends to one of said supporting-brackets.

6. In a folding truck, in combination, two frame members hinged together; supporting-wheels therefor; a supporting-bracket pivotally secured to each of said members; a stop for limiting the pivotal movement of each of said supporting-brackets; and a chain extending between said frame members, and being attached at each of its ends to one of said supporting-brackets.

7. In a folding truck, in combination, two frame members hinged together; supporting-wheels therefor; two sheaves on each of said members; a supporting-bracket pivotally secured to each of said members; two caster-wheels on each of said supporting-brackets; and two chains passing over said sheaves on the two frame members, which chains are attached at their ends to said brackets.

8. In a folding truck, in combination, two frame members, each having diagonal braces, two brace-rods, and two sheaves mounted on one of said brace-rods; a pivotal shaft for said frame members; supporting-wheels rotatably mounted on said pivotal shaft; a supporting-bracket pivotally mounted on one of said brace-rods in each frame member; a stop-block for limiting the pivotal movement of each of said supporting-brackets; two caster-wheels on each of said brackets; two chains extending over said sheaves, and being attached at their ends to the said brackets; and two balls on each of said chains, for limiting the movement of the latter.

NICHOLAS F. PURCELL.

Witnesses:
L. L. MILLER,
JOHN M. PEEBLES.